(12) United States Patent
Calhoun et al.

(10) Patent No.: US 7,596,376 B2
(45) Date of Patent: Sep. 29, 2009

(54) METHODS, APPARATUSES AND SYSTEMS FACILITATING CLIENT HANDOFFS IN WIRELESS NETWORK SYSTEMS

(75) Inventors: Patrice R. Calhoun, Pleasanton, CA (US); Joshua Glenn Broch, San Jose, CA (US); Robert B. O'Hara, Jr., Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 309 days.

(21) Appl. No.: 11/182,239

(22) Filed: Jul. 15, 2005

(65) Prior Publication Data

US 2006/0187878 A1 Aug. 24, 2006

Related U.S. Application Data

(60) Provisional application No. 60/654,655, filed on Feb. 18, 2005.

(51) Int. Cl.
*H04W 4/00* (2006.01)
(52) U.S. Cl. ............... 455/436; 370/338; 455/432.1
(58) Field of Classification Search .............. None
See application file for complete search history.

(56) References Cited

U.S. PATENT DOCUMENTS

| | | | | |
|---|---|---|---|---|
| 4,398,063 | A | * | 8/1983 | Hass et al. ............... 455/436 |
| 5,491,692 | A | | 2/1996 | Gunner et al. |
| 5,564,079 | A | | 10/1996 | Olsson |
| 5,654,959 | A | | 8/1997 | Baker et al. |
| 5,684,860 | A | | 11/1997 | Milani et al. |
| 5,940,384 | A | | 8/1999 | Carney et al. |
| 6,081,229 | A | | 6/2000 | Soliman et al. |
| 6,097,596 | A | | 8/2000 | Verravalli et al. |
| 6,104,928 | A | | 8/2000 | Waugh |
| 6,112,095 | A | | 8/2000 | Wax et al. |
| 6,115,605 | A | | 9/2000 | Siccardo et al. |
| 6,134,448 | A | | 10/2000 | Shoji et al. |
| 6,140,964 | A | | 10/2000 | Suguira et al. |

(Continued)

FOREIGN PATENT DOCUMENTS

EP 0 930 514 7/1999

(Continued)

OTHER PUBLICATIONS

IEEE Standards 802.11F IEEE *Trial-Use Recommended Practice for Milti-Vendor Access Point Interoperability bia an Inter-Access Point Protocol Acrodd Distribution Systems Supporting IEEE 802.11 Operation*, IEEE Computer Society, The Institute of Electrical and Electronics Engineers, Inc., Jul. 14, 2003.

(Continued)

*Primary Examiner*—Nick Corsaro
*Assistant Examiner*—Joel Ajayi
(74) *Attorney, Agent, or Firm*—Baker Botts L.L.P.

(57) ABSTRACT

Methods, apparatuses, and systems directed to facilitating roaming and client handoffs in wireless networks. In one implementation, the present invention is directed to a coordination mechanism facilitating handoffs of wireless clients in a wireless network infrastructure. In one implementation, the coordination mechanism minimizes the use of group- or multi-casting to provide a scalable wireless network roaming infrastructure.

14 Claims, 8 Drawing Sheets

U.S. PATENT DOCUMENTS

| | | | |
|---|---|---|---|
| 6,167,274 | A | 12/2000 | Smith |
| 6,198,935 | B1 | 3/2001 | Saha et al. |
| 6,208,629 | B1 | 3/2001 | Jaszewski et al. |
| 6,212,391 | B1 | 4/2001 | Saleh et al. |
| 6,223,028 | B1 | 4/2001 | Chang et al. |
| 6,240,077 | B1 | 5/2001 | Vuong et al. |
| 6,243,413 | B1 | 6/2001 | Beukema |
| 6,249,252 | B1 | 6/2001 | Dupray |
| 6,259,406 | B1 | 7/2001 | Suguira et al. |
| 6,269,246 | B1 | 7/2001 | Rao et al. |
| 6,275,190 | B1 | 8/2001 | Suguira et al. |
| 6,282,427 | B1 | 8/2001 | Larsson et al. |
| 6,286,038 | B1 | 9/2001 | Reichmeyer et al. |
| 6,304,218 | B1 | 10/2001 | Sugiura et al. |
| 6,332,077 | B1 | 12/2001 | Wu et al. |
| 6,338,140 | B1 | 1/2002 | Owens et al. |
| 6,414,634 | B1 | 7/2002 | Tekinay |
| 6,415,155 | B1 | 7/2002 | Koshima et al. |
| 6,441,777 | B1 | 8/2002 | MdDonald |
| 6,456,892 | B1 | 9/2002 | Dara-Abrams et al. |
| 6,473,038 | B2 | 10/2002 | Patwari et al. |
| 6,473,413 | B1 * | 10/2002 | Chiou et al. ................. 370/331 |
| 6,526,283 | B1 | 2/2003 | Janz |
| 6,556,942 | B1 | 4/2003 | Smith |
| 6,664,925 | B1 | 12/2003 | Moore et al. |
| 6,754,488 | B1 | 6/2004 | Won et al. |
| 6,760,318 | B1 | 7/2004 | Bims |
| 6,760,671 | B1 | 7/2004 | Batcher et al. |
| 6,766,453 | B1 | 7/2004 | Nessett et al. ................. 713/171 |
| 6,788,658 | B1 | 9/2004 | Bims |
| 6,799,047 | B1 | 9/2004 | Bahi et al. |
| 6,810,428 | B1 | 10/2004 | Larsen et al. |
| 6,917,819 | B2 | 7/2005 | Collins |
| 6,925,069 | B2 | 8/2005 | Koos et al. |
| 6,925,070 | B2 | 8/2005 | Proctor, Jr. |
| 6,954,641 | B2 | 10/2005 | McKenna et al. |
| 6,957,067 | B1 | 10/2005 | Iyer et al. |
| 6,990,428 | B1 | 1/2006 | Kaiser et al. |
| 7,002,943 | B2 | 2/2006 | Bhagwat et al. |
| 7,025,209 | B2 | 4/2006 | Hawkins |
| 7,068,644 | B1 | 6/2006 | McConnell et al. |
| 7,085,576 | B2 | 8/2006 | Ranganathan |
| 7,099,669 | B2 | 8/2006 | Sheffield |
| 7,127,258 | B2 | 10/2006 | Zegelin |
| 7,133,909 | B2 | 11/2006 | Bahl |
| 7,161,914 | B2 | 1/2007 | Shoalb et al. |
| 7,164,663 | B2 | 1/2007 | Frank et al. |
| 7,212,837 | B1 | 5/2007 | Calhoun et al. |
| 7,269,151 | B2 | 9/2007 | Diener et al. |
| 7,277,416 | B1 * | 10/2007 | Chang et al. ................. 370/338 |
| 7,286,833 | B2 | 10/2007 | Friday et al. |
| 7,313,113 | B1 | 12/2007 | Hills et al. |
| 7,366,524 | B2 | 4/2008 | Watanabe et al. |
| 2002/0046258 | A1 | 4/2002 | Yasushi et al. |
| 2002/0168958 | A1 | 11/2002 | Ford et al. |
| 2002/0174335 | A1 | 11/2002 | Zhang et al. |
| 2002/0188723 | A1 | 12/2002 | Choi |
| 2002/0194384 | A1 | 12/2002 | Habetha |
| 2003/0023746 | A1 | 1/2003 | Loguinov |
| 2003/0033423 | A1 * | 2/2003 | Okabe et al. ................. 709/232 |
| 2003/0117985 | A1 | 6/2003 | Fuji et al. |
| 2003/0134642 | A1 | 7/2003 | Kostic et al. |
| 2003/0135762 | A1 | 7/2003 | Maccauley |
| 2003/0139197 | A1 | 7/2003 | Kostic et al. |
| 2003/0181215 | A1 | 9/2003 | Cromer et al. |
| 2003/0188006 | A1 | 10/2003 | Bard |
| 2003/0198208 | A1 | 10/2003 | Koos, Jr. et al. |
| 2003/0219008 | A1 | 11/2003 | Hrastar |
| 2003/0224787 | A1 | 12/2003 | Gandolfo |
| 2004/0003285 | A1 | 1/2004 | Whelan et al. |
| 2004/0008652 | A1 | 1/2004 | Tanzella et al. |
| 2004/0022222 | A1 * | 2/2004 | Clisham ................. 370/338 |
| 2004/0023640 | A1 | 2/2004 | Ballai |
| 2004/0047324 | A1 | 3/2004 | Diener |
| 2004/0049699 | A1 | 3/2004 | Griffith et al. |
| 2004/0076134 | A1 | 4/2004 | Barber et al. |
| 2004/0103194 | A1 | 5/2004 | Islam et al. |
| 2004/0111607 | A1 | 6/2004 | Yallepeddy |
| 2004/0176108 | A1 | 9/2004 | Misikangas |
| 2004/0198220 | A1 | 10/2004 | Whelan et al. |
| 2004/0203779 | A1 | 10/2004 | Gabara |
| 2004/0203910 | A1 | 10/2004 | Hind et al. |
| 2005/0030929 | A1 | 2/2005 | Swier et al. |
| 2005/0030945 | A1 * | 2/2005 | Sarikaya et al. ............. 370/389 |
| 2005/0060319 | A1 | 3/2005 | Douglas et al. |
| 2005/0073979 | A1 | 4/2005 | Barber et al. |
| 2005/0114649 | A1 | 5/2005 | Challener et al. |
| 2005/0137790 | A1 | 6/2005 | Yamada et al. |
| 2005/0207381 | A1 | 9/2005 | Aljadeff et al. |
| 2007/0232307 | A1 | 10/2007 | Ibrahim et al. |

FOREIGN PATENT DOCUMENTS

| | | |
|---|---|---|
| EP | 0 967 816 | 12/1999 |
| EP | 1 018 457 | 7/2000 |
| EP | 1 296 531 | 3/2003 |
| EP | 1 301 055 | 4/2003 |
| JP | 02044929 | 2/1990 |
| JP | 2004340864 | 12/2004 |
| WO | WO 98/41048 | 12/1999 |
| WO | WO 99/08909 | 7/2000 |
| WO | WO 97/33386 | 10/2000 |
| WO | WO 02/43425 | 5/2002 |
| WO | WO 02/054813 | 7/2002 |
| WO | WO 03/023443 | 3/2003 |

OTHER PUBLICATIONS

Dan Simone, 802.1 lk makes WLANs measure up. Networkworld.com, 3/29/04, http://www.networkworld.com/news/tech/2004/0329techupdate.html.

Fanny Mlinarsy, metrics and Methods Bring VoWLAN Success, wsdmag.com, Mar. 2005 http://www.wsdmag.com/Articles/Print.cfm?ArticleID=10003.

Rob Tillstston, CoPilot Live GPS Navigation System, Gadgeteer Hands On Review, The Gadgeteer, Apr. 12, 2006.

International Standard, ISO/IEC 8802-11 ANSI/IEEE std. 802.11, 1999 Edition, Part II: Wireless LAN medium Access Control (MAC) and Physical Layer (PHY) specifications, pp. 122-137, 1999.

"tcp-masq" Internet citation http://speed.cis.nctu.edu.tw/bandwith/opensource/. Daa Sheet Cisco Aironet 1200 Series Access Point, pp. 1-13, posted Mar. 11, 2002.

Chirumamilla, Mohan K. and Ramamurthy, Byrav, "Agent Based Intrusion Detection and Response System for Wireless LANs" IEEE Int'l conference on Communications, 2003, vol. 1, pp. 492-495.

"IBM Research Demonstrates Industry's First Auditig Tool for Wireless Network Security" Jul. 12, 2001, Hawthorne, N. Y. IBM Research News, 'Online, URL: http://domino.research.ibm.com/comm/re.nsf/pages/news.20010712_wireless.html.

"IBM Researchers Demonstrate Industry's First Self-Diagnostic Wireless Security Monitoring Tool" Jun. 21, 2002, Hawthonre NY IBM NIEUWS, 'Online! URL: http://domino.research.ibm.com/comm/re.nsf/pages/news.20020617_dwsa.html.

"Ekahau Logical Areas-location enabling the Wi-Fi network", Apr. 4, 2003, Ekahau, Inc., Saratoga, CA. Company's URL: www.ekahau.com.

"Ekahau Positioning Engine 2.0: Product Overview", Apr. 4, 2003, Ekahau, Inc., Saratoga, CA. Company's URL: www.ekahau.com/positioningengine/.

"Ekahau Positioning Engine 2.0: Data Sheet", Apr. 4, 2003, Ekahau, Inc., Saratoga, CA. URL: www.ekahau.com/pdf/EPE_2.0_datasheet.PDF.

"Indoor Positioning in 802.11b Networks," Apr. 4, 2003, Ekahau, Inc., Saratoga, CA. URL: www.ekahau.com/products/positioningengine.html.

"InFielder" Apr. 22, 2003. Wireless Valley, Austin, Texas URL: http://www.wirelessvalley.com/Products/InFielder/InFielder.asp.

"LANFielder", Apr. 22, 2003 Wireless Valley, Austin, Texas URL: http://www.wirelessvalley.com/Products/LANFielder/LANFielder.asp.

"Optimatic", Apr. 22, 2003 Wireless Valley, Austin, Texas URL: http://www.wirelessvalley.com/Products/Optimatic/Optimatic.asp.

"Predictor", Apr. 22, 2003 Wireless Valley, Austin, Texas URL: http://www.wirelessvalley.com/Products/Predictor/Predictor.asp.

"LANFielder Product Literature", Feb. 10, 2004, Wireless Valley, austin, Texas, URL: http://www.wirelessvalley.com/Assets/brochures/LanFielder.pdf.

Conley, C., "Securing WLANS with Location-Enabled Networks" Wireless Security Perspectives, vol. %, No. 3, Mar. 2003, Organization's URL: www/cnp-wireless.com/wsp.html.

"Company Information" Apr. 6, 2004 Corsair Communications: A LightBridge Company, Burlington, MA. Company's URL: www.lightbridge.com.

"Corporate Fact Sheet" Aruba Wireless Networks, San Jose, CA Feb. 10, 2004. URL: http://www.arubanetworks.com/pdf/corporate_fact_sheet.pdf.

"Airwave Rogue Access Point Detection", 2002 Airwave Wireless, Inc. San Mateo, CA. URL: http://airwave.com/features.html.

Geier, J. "Identifying Rogue Access Points", Jan. 6, 2003. Wi-Fi Planet Tutorials. URL: http://www.wi-fiplanet.com/tutorials/article/php/1564431.

Brewin, B. "IBM Develops Tool to Detect Rogue Wireless LAN Access Points" Jun. 17, 2002, Computerworld, Framington, MA. URL: http://www.computerworld.com/mobiletopics/mobile/story/0,10801,72065.00 html.

Bulusu, N., Heldermann, J., Estrin, D. "GPS-less Low Cost Outdoor Localization for Very Small Devices," *IEEE Personal Communications*, Oct. 2000 URL: http://lecs.cs.ucla.edu/-bulusu/papers/Bulusu00a.pdf.

"Accessing Wireless Security with AiroPeek and AiroPeek NX," A WildPackets Academy Tutorial from www.wildpackets.com, WildPackets Inc., Walnut Creek, CA, Jan. 16, 2003 URL: http://www.wildpackets.com/elements/whitepapers/RogueAccess Points.pdf.

"AiroPeek and Wireless Security: Identifying and Locating Rogue Access Points", A WildPackets Academy Tutorial from www.wildpackets.com, WildPackets Inc., Walnut Creek, CA, Jan. 16, 2003 URL: http://www.wildpackets.com/elements/whitepapers/RogueAccess Points.pdf.

Craiger, J.P. "802.11, 802.1x and Wireless Security," Jun. 23, 2002. From the SANS' Information Security Reading Room on www.sans.org, The SANS Institute, Bethesda, MD URL: http://www.sans.org.rr/papers/68171.pdf.

Baily, S. "Is IEEE 802.1x Ready for General Deployment?" Apr. 7, 2002, From the SANS' Information Security Reading Room on www.sans.org, The SANS Institute, Bethesda, MD URL: http://www.sans.org.rr/papers/9/709.pdf.

PCT Notification of Transmittal of the International Search Report and the Written Opinion of the International Searching authority or the Declaration (PCT Rule 44.1), dated Sep. 18, 2006, International Application No. PCT/US2006/00078.

USPTO, Office Action for U.S. Appl. No. 11/443,823, filed May 31, 2006 in the name of Allan Thomson, 11 pp, Mar. 31, 2009.

USPTO, Office Action for U.S. Appl. No. 11/182,264 filed Jul. 15, 2005 in the name of Robert J. Friday, 22 pp, Dec. 10, 2008.

IEEE Standards 802.11F IEEE *Trial-Use Recommended Practice for Multi-Vendor Access Point Interoperability via an Inter-Access Point Protocol Acrodd Distribution Systems Supporting IEEE 802.11 Operation*, IEEE Computer Society, The Institute of Electrical and Electronics Engineers, Inc., Jul. 14, 2003.

* cited by examiner

Fig._2

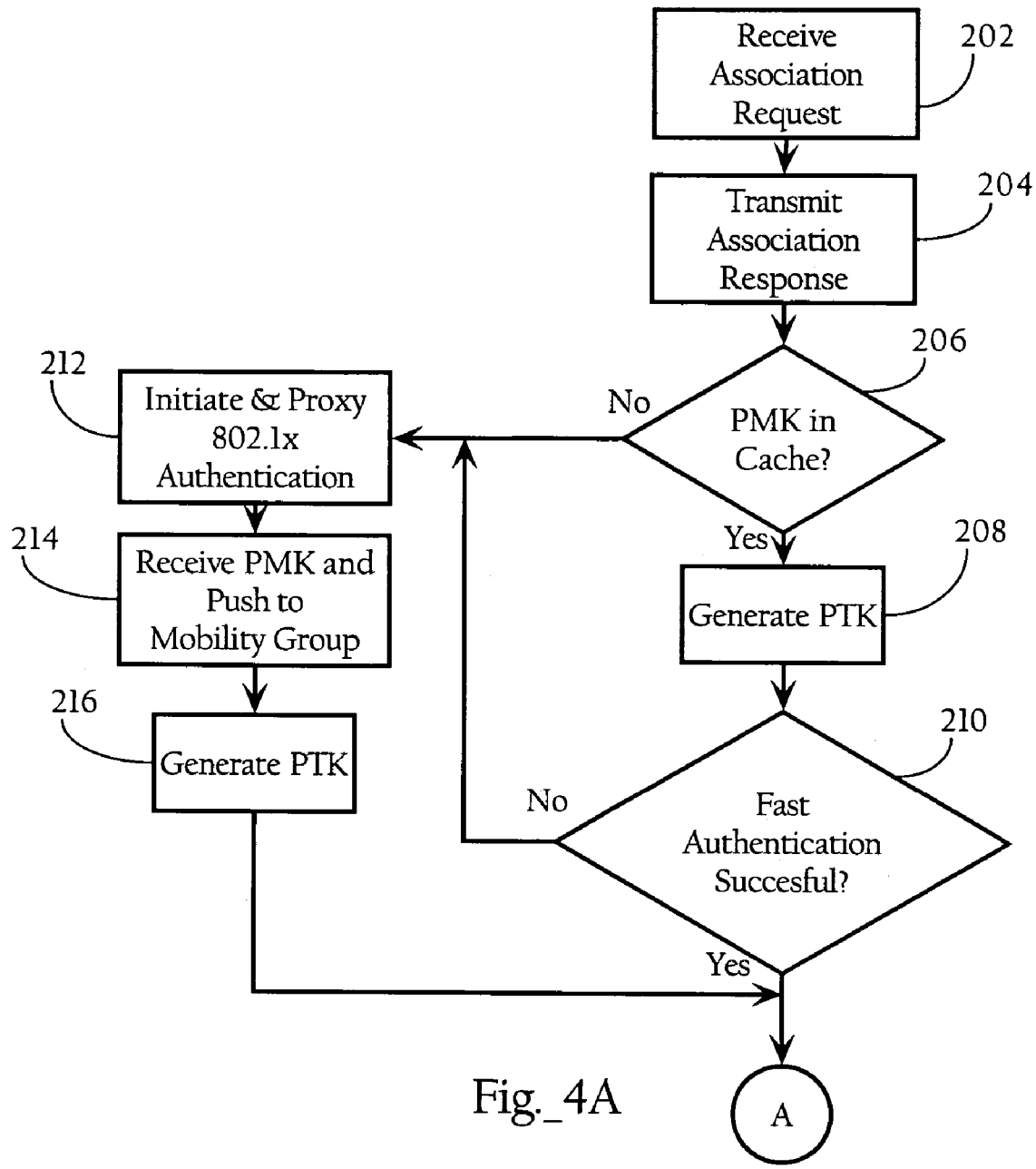
Fig._4A

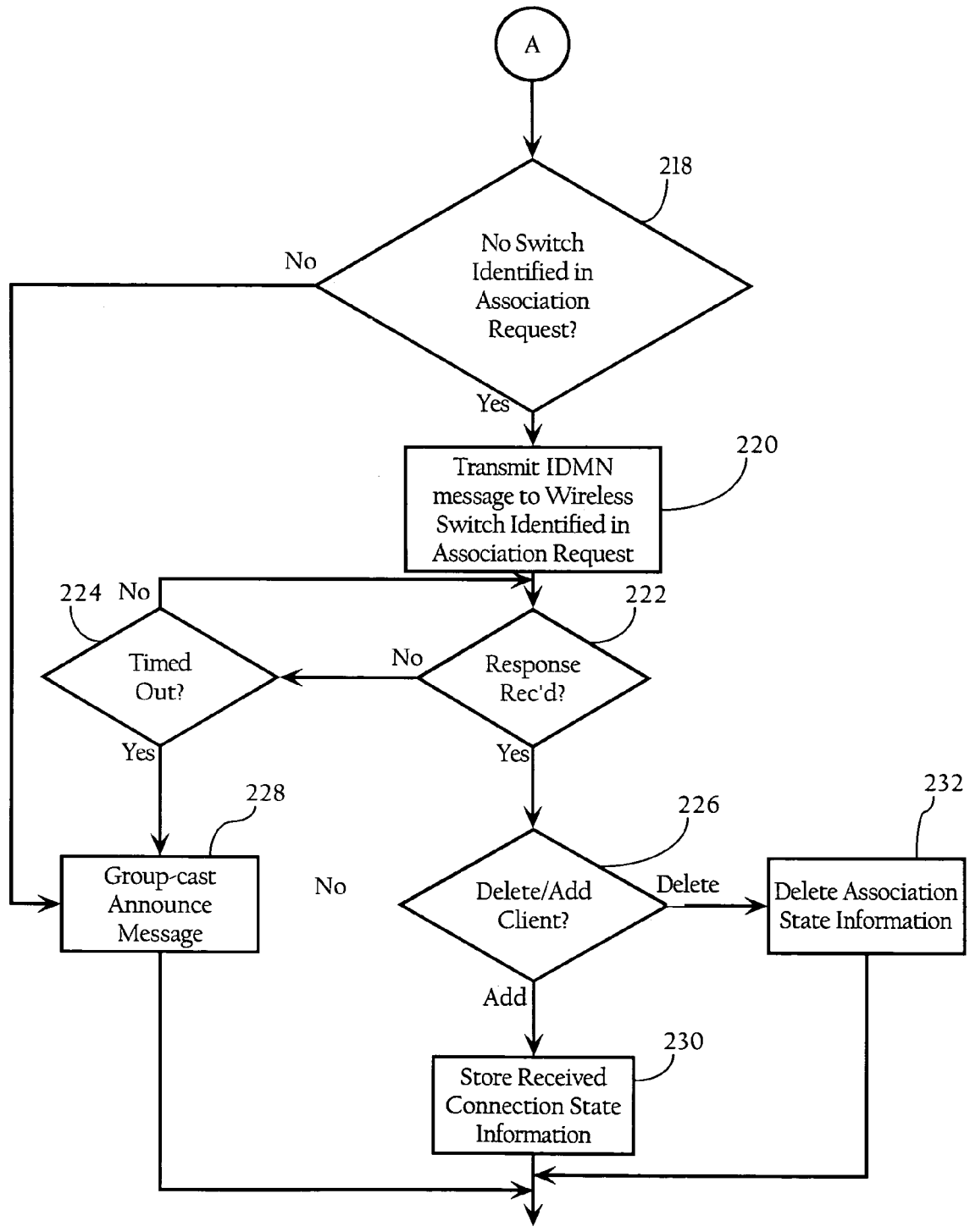
Fig._4B

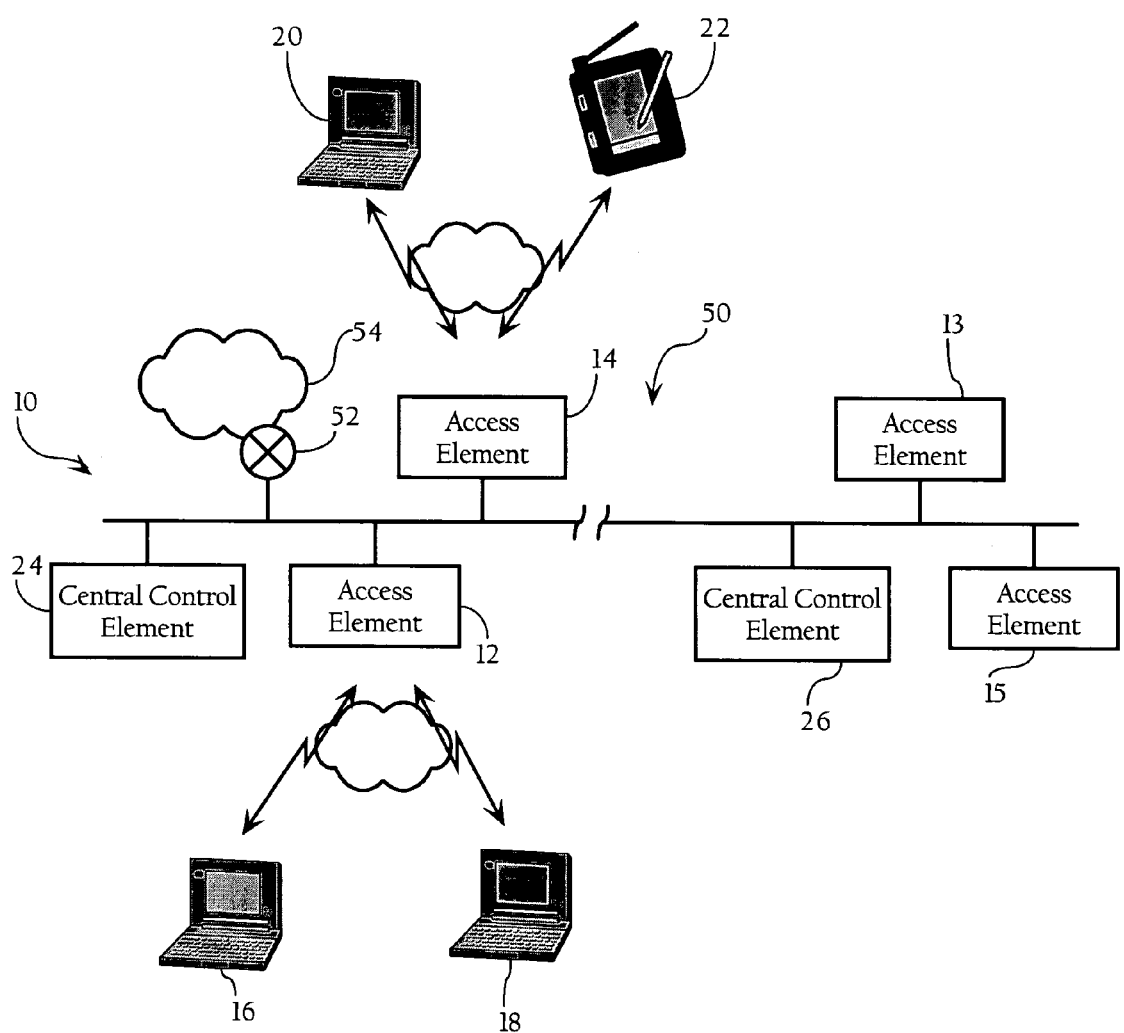
Fig._5

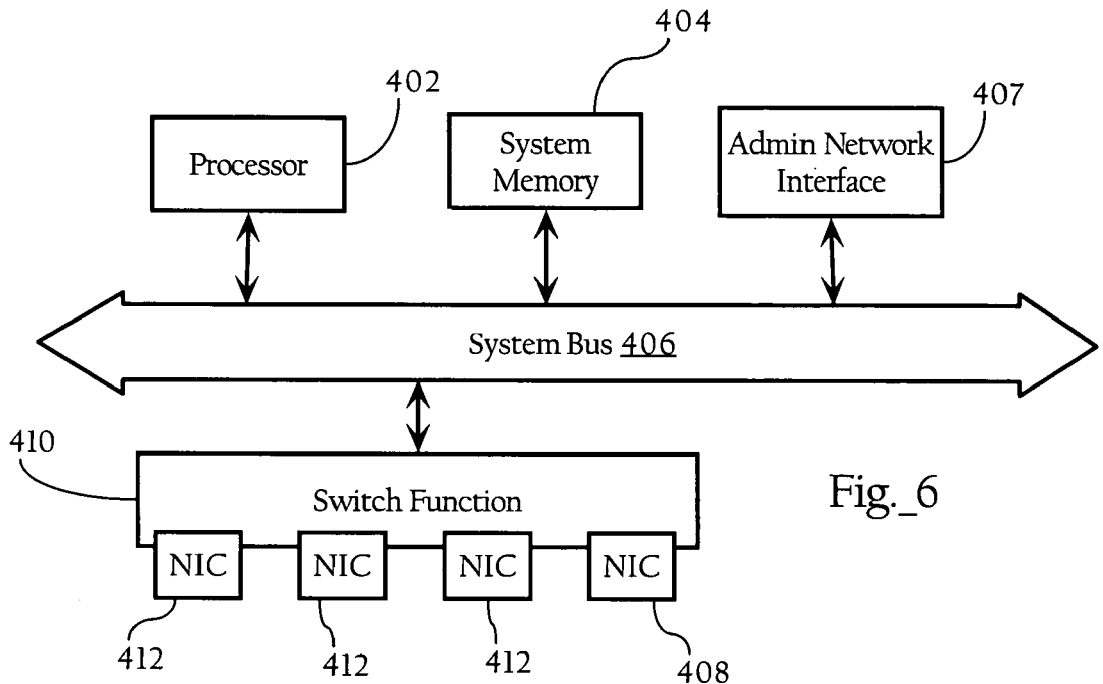
Fig._6
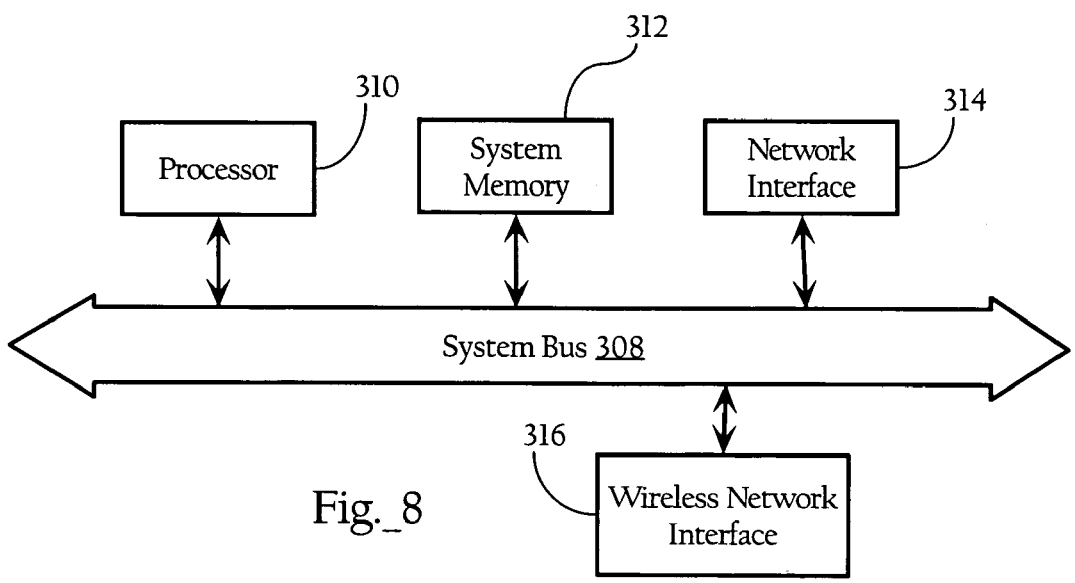
Fig._8

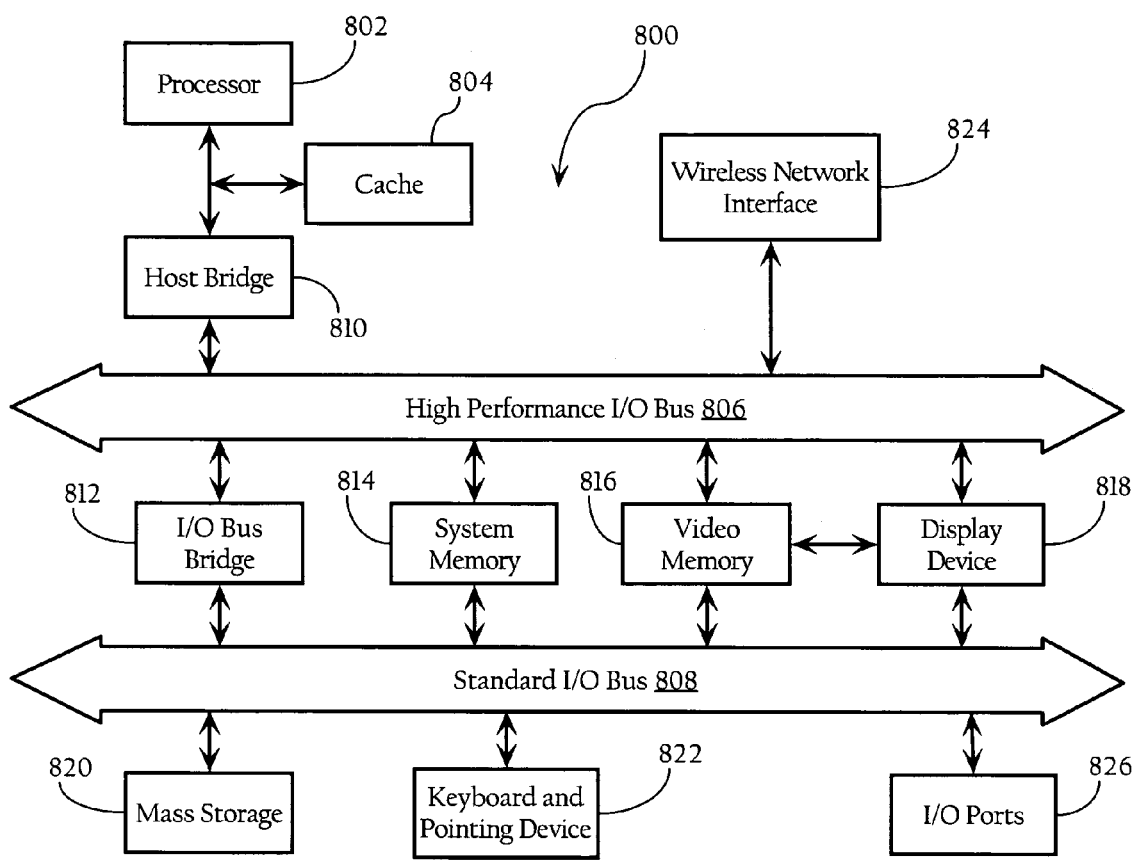
Fig._7

METHODS, APPARATUSES AND SYSTEMS FACILITATING CLIENT HANDOFFS IN WIRELESS NETWORK SYSTEMS

CROSS-REFERENCE TO RELATED APPLICATIONS

The present application claims priority to U.S. Provisional Application Ser. No. 60/654,655 filed Feb. 18, 2005, entitled "Methods, Apparatuses and Systems Facilitating Client Handoffs in Wireless Network Systems," which is incorporated herein for all purposes.

This application also makes reference to the following commonly owned U.S. patent applications and/or patents, which are incorporated herein by reference in their entirety for all purposes:

U.S. patent application Ser. No. 10/155,938 in the name of Patrice R. Calhoun, Robert B. O'Hara, Jr. and Robert J. Friday, entitled "Method and System for Hierarchical Processing of Protocol Information in a Wireless LAN;"

U.S. patent application Ser. No. 10/407,357 in the name of Patrice R. Calhoun, Robert B. O'Hara, Jr. and Robert J. Friday, entitled "Method and System for Hierarchical Processing of Protocol Information in a Wireless LAN;" and U.S. patent application Ser. No. 10/447,735 in the name of Robert B. O'Hara, Jr., Robert J. Friday, Patrice R. Calhoun and Paul F. Dietrich, entitled "Wireless Network Infrastructure including Wireless Discovery and Communication Mechanism."

FIELD OF THE INVENTION

The present invention relates to wireless computer networks and, more particularly, to methods, apparatuses and systems facilitating client handoffs in wireless network systems.

BACKGROUND OF THE INVENTION

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but the changing role WLAN technology now plays in people's work and lifestyles, across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

As enterprises and other entities increasingly rely on wireless networks, monitoring and management of the components implementing the wireless network environments become critical to performance and security. Heretofore, it has not been recognized how important visibility into all layers of the network protocol is to optimization of network manageability and user performance in wireless LANs (WLANs). Unlike centrally-managed cellular wireless systems, known WLAN solutions use distributed access points to act as bridges between the wired infrastructure and the wireless clients, removing physical and wireless media access protocol information from the protocol frames that are passed onto the infrastructure network. This results in uncoordinated handoffs of wireless clients moving between access points. An uncoordinated system of access points makes it difficult to manage a large number of access points, because there is no point of coordination. For example, known prior art wireless network systems such as conventional 802.11 systems provide the initial handshaking, access authentication and access association at a remote node without attention to overall network loading and signal quality.

This type of distributed architecture creates many problems affecting network management, mobility, and performance. Since each wireless LAN access point is a separate managed device, a distributed architecture in general introduces many new managed elements in the network without sufficient attention to their global effects. Since the access points act in their own self-interest and are not aware of the actions taken by surrounding access points, they handle mobility (e.g., handoff actions) as a local event, which significantly increases latency.

U.S. application Ser. Nos. 10/155,938 and 10/407,357, identified above, disclose hierarchical wireless network architectures that optimizes network management and performance of a relatively autonomously-managed WLAN. According to the system architecture, a central control element (such as a wireless switch) manages and controls one more access elements. These light-weight access elements perform real-time communication functions, such as data transfer and acknowledgements, while the central control element manages the connection between the access element and one or more wireless client devices.

An important function to the operation of WLANs is roaming—i.e., the handoff of a client from one access point to another as the client roams about the coverage area provided by the wireless network infrastructure. During a handoff event, a wireless client essentially abandons its connection with one access point and establishes a new connection with another, resulting in a small period without connectivity and therefore possible packet loss. A handoff event can be divided into three phases: 1) scanning/probing, 2) re-association, and 3) state information transfer. When the signal quality between an access point and a client degrades, the client, sensing that connectivity has been lost, initiates a handoff by scanning available RF channels for access points with which to associate. Scanning for access points can employ both a passive mechanism (e.g., detecting beacon frames transmitted by the access points), and an active mechanism (e.g., broadcasting probe responses and receiving probe requests). After selecting an access point identified during the scan, the client attempts to associate with the selected access point. In this re-association phase, the wireless client and the selected access point engage in a handshake process to establish the connection.

In 802.11 WLANs, a typical handoff may also involve an exchange of messages between the prior and new access point to complete a transfer of physical/link layer connectivity between one access point and another access point. The message exchanges may include the transfer of connection state information, such as authentication credentials, between the prior access point and the new access point. The interaction between access points can be accomplished using standard or proprietary protocols. For example, the draft IEEE 802.11F specification provides a recommended general framework for the exchange of connection state information between access points during a client handoff. For example, when a wireless client discovers a new access point, it transmits a re-association message, including the BSSID of the old access point, to the new access point. The new access point uses a mechanism to resolve the address of the old access point and transmits a request for the connection state information of the client. In hierarchical wireless networks, the handoff can occur between two access points managed by the same wireless switch, or between access points managed by different wireless switches. In the former case, the transfer of connection state information between access points is either not required or greatly simplified, as this connection state information is maintained by a common wireless switch. Client handoffs that implicate two wireless switches, however, may require the exchange of wireless connection state information between the wireless switches. While the inter-access-point protocol set forth in the draft 802.11F specification to transfer state information between the switches can be utilized, the mapping of BSSIDs to wireless switch addresses presents configuration overhead, especially for large scale deployments. For example, the 802.11F specification discloses that RADIUS servers may be used to provide the mapping between the BSSID and the previous network access device. Furthermore, the 802.11F specification does not address the situation where a client attempts to re-associate with two switches in alternating succession, or with multiple switches, as it roams about the wireless network environment.

In light of the foregoing, a need in the art exists for methods, apparatuses and systems that increase the efficiency, and reduce the latency associated with, roaming in wireless network environments. Embodiments of the present invention substantially fulfill this need.

DESCRIPTION OF THE DRAWINGS

FIGS. 4A and 4B, together, are a flow chart diagram illustrating the process flow, according to one implementation of the present invention, including an inter-switch coordination mechanism.

FIG. 5 is a functional block diagram illustrating an alternative wireless network system architecture.

FIG. 6 is a functional block diagram illustrating the components of a central control element according to one embodiment of the invention.

FIG. 7 is a functional block diagram illustrating the components of a wireless client according to one embodiment of the invention.

FIG. 8 is a functional block diagram illustrating the components of an access element according to one embodiment of the invention.

DESCRIPTION OF PREFERRED EMBODIMENT(S)

A. Operating Environment and Exemplary System Architectures

For didactic purposes an embodiment of the present invention is described as operating in a WLAN environment as disclosed in U.S. application Ser. Nos. 10/155,938 and 10/407,357 incorporated by reference herein. As discussed below, however, the present invention can be implemented according to a vast array of embodiments, and can be applied to a variety of WLAN architectures.

Figure 1:
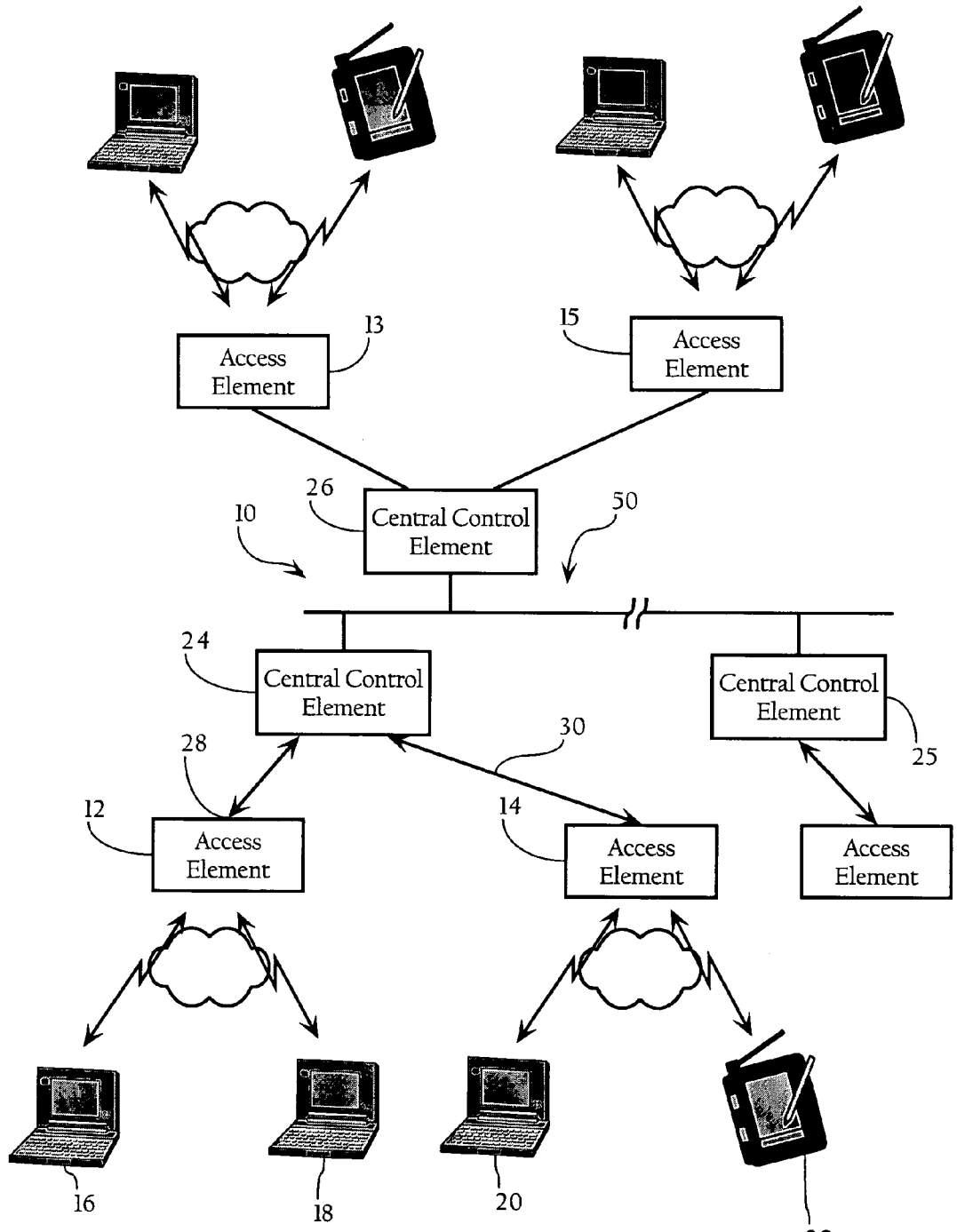
FIG. 1 is a functional block diagram illustrating a wireless network system according to an embodiment of the present invention.

FIG. 1 illustrates a wireless computer network environment according to an embodiment of the present invention. Referring to FIG. 1, there is shown a block diagram of a wireless Local Area Network system 10 according to an embodiment of the invention. A specific embodiment of the invention includes the following elements: access elements 12, 14 for wireless communication with client remote elements 16, 18, 20, 22, central control elements 24, 25, 26, and means for communication between the access elements and the central control elements, typically direct line access 28, 30, but potentially a wireless backbone, fiber or other reliable link. As disclosed in U.S. patent application Ser. No. 10/407, 357, in another embodiment, the access elements, such as access elements 12, 14 are directly connected to network 50 or a virtual local area network (VLAN) for communication with a corresponding central control element 24, 26. See FIG. 5. For purposes of this disclosure, access elements, access points and APs are used interchangeably. Furthermore, the network may further include other functionality not illustrated, such as DHCP proxies and servers, and RADIUS or other authentication functionality.

The access elements 12-15, in one implementation, are coupled via communication means using a wireless local area network (WLAN) protocol (e.g., IEEE 802.11a, 802.11b/g, etc.) to the client remote elements 16, 18, 20, 22. The communications means 28, 30 between the access elements 12, 14 and the central control element 24 is typically an Ethernet (e.g., IEEE 802.3) link or network, but it could be anything else which is appropriate to the environment. As described in U.S. application Ser. Nos. 10/155,938 and 10/407,357, the access elements 12, 14 and the central control element 24 tunnel network traffic associated with corresponding remote client elements 16, 18; 20, 22 via direct access lines 28 and 30, respectively, or a LAN. Central control element 24 is also operative to bridge the network traffic between the remote client elements 16, 18; 20, 22 transmitted through the tunnel with corresponding access elements 12, 14. In one implementation, the central control elements are Airespace 4100 WLAN switches, while the access elements are Airespace 1200 Access Points, both offered by Airespace, Inc. of San Jose, Calif. As FIG. 6 shows, in one implementation, the central control elements each comprise a switch function or fabric 410 comprising a network interface 408 (e.g., a Ethernet adapter) for connection to network 50 and corresponding network interfaces 412 for connection to the access elements, a processor 402, a memory 404, one or more software modules, stored in the memory 402, including instructions for performing the functions described herein, and a system bus 406 operably connecting these components. The central control elements may optionally include an administrative network interface 407 allowing for administrative access for such purposes as configuration and diagnostic access. Still further, access elements 12, 14 typically comprise a processor 310, a memory 312, a network interface 314 (e.g., an 802.3 interface) for communication with a central control element, and a wireless network interface 316 (e.g., an IEEE 802.11 WLAN interface) for wireless communication with remote client elements, one or more software modules including instructions for performing the functions described herein, and a system bus 308 operably connecting these components (see FIG. 8).

In one implementation, remote client elements include a processor, a memory, a wireless network interface, and a wireless network interface driver that includes logic directed to the roaming functions described herein. In one implementation, the client-side functionality corresponding to the present invention can be embodied in a driver code object stored on a computer-readable medium, or embodied in data signals transmitted to a remote device, that when installed on a client device implements the roaming functions described herein.

FIG. 7 illustrates, for didactic purposes, the hardware architecture of a wireless client according to one implementation of the present invention. The present invention, however, can be implemented on a wide variety of computer system architectures, such as Personal Digital Assistants, Laptop computers, and the like. An operating system manages and controls the operation of system 800, including the input and output of data to and from software applications (not shown). The operating system provides an interface, such as a graphical user interface (GUI), between the user and the software applications being executed on the system. According to one embodiment of the present invention, the operating system is the Windows® 95/98/NT/XP operating system, available from Microsoft Corporation of Redmond, Wash. However, the present invention may be used with other conventional operating systems, such as the Apple Macintosh Operating System, available from Apple Computer Inc. of Cupertino, Calif., UNIX operating systems, LINUX operating systems, and the like.

FIG. 7 illustrates one embodiment of a computer hardware system suitable for use with the present invention. In the illustrated embodiment, hardware system 800 includes processor 802 and cache memory 804 coupled to each other as shown. Additionally, hardware system 800 includes high performance input/output (I/O) bus 806 and standard I/O bus 808. Host bridge 810 couples processor 802 to high performance I/O bus 806, whereas I/O bus bridge 812 couples the two buses 806 and 808 to each other. Coupled to bus 806 are network/communication interface 824, system memory 814, and video memory 816. In turn, display device 818 is coupled to video memory 816. Coupled to bus 808 are mass storage 820, keyboard and pointing device 822, and I/O ports 826. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of computer hardware system 800 perform their conventional functions known in the art. In particular, wireless network interface 824 is used to provide communication between system 800 and any of a wide range of wireless networks, such as a WLAN (e.g., IEEE 802.11) network, etc. Mass storage 820 is used to provide permanent storage for the data and programming instructions to perform the above described functions implemented in the system controller, whereas system memory 814 (e.g., DRAM) is used to provide temporary storage for the data and programming instructions when executed by processor 802. I/O ports 826 are one or more serial and/or parallel communication ports used to provide communication between additional peripheral devices which may be coupled to hardware system 800.

Hardware system 800 may include a variety of system architectures and various components of hardware system 800 may be rearranged. For example, cache 804 may be on-chip with processor 802. Alternatively, cache 804 and processor 802 may be packed together as a "processor module", with processor 802 being referred to as the "processor core". Furthermore, certain implementations of the present invention may not require nor include all of the above components. For example, the peripheral devices shown coupled to standard I/O bus 808 may be coupled to high performance I/O bus 806; in addition, in some implementations only a single bus may exist with the components of hardware system 800 being coupled to the single bus. Furthermore, additional components may be included in system 800, such as additional processors, storage devices, or memories.

As discussed above, in one embodiment, the operations of the client-side roaming functionality described herein are implemented as a series of software routines run by hardware system 800 of FIG. 7. These software routines, which can be embodied in a wireless network interface driver, comprise a plurality or series of instructions to be executed by a processor in a hardware system, such as processor 802. Initially, the series of instructions are stored on a storage device, such as mass storage 820. However, the series of instructions can be stored on any conventional storage medium, such as a diskette, CD-ROM, ROM, etc. Furthermore, the series of instructions need not be stored locally, and could be received from a remote storage device, such as a server on a network, via network/communication interface 824. The instructions are copied from the storage device, such as mass storage 820, into memory 814 and then accessed and executed by processor 802.

As described in the above-identified patent applications, central control element 24 operates to perform link layer management functions, such as authentication and association on behalf of access elements 12, 14. For example, the central control element 24 provides processing to dynamically configure a wireless Local Area Network of a system according to the invention while the access elements 12, 14 provide the acknowledgment of communications with the client remote elements 16, 18, 20, 22. The central control element 24 may for example process the wireless LAN management messages passed on from the client remote elements 16, 18; 20, 22 via the access elements 12, 14, such as authentication requests and association requests, whereas the access elements 12, 14 provide immediate acknowledgment of the communication of those messages without conventional processing thereof. Similarly, the central control element 24 may for example process physical layer information. Still further, the central control element 24 may for example process information collected at the access elements 12, 14 on channel characteristic, propagation, and interference or noise. Central control element 24 may also transmit control messages to the access elements 12, 14 to change various operational parameters, such as frequency channel and transmit power. Central control element 26 and associated access elements 13, 15 operate in a similar or identical manner. Still further, access elements 12, 14 may perform other time-sensitive operations, such as the transmission of beacon frames at each beacon interval.

As FIG. 5 illustrates, according to another embodiment, central control element 24 can communicate with access elements 12, 14 over local area network segment of network 50. In addition, using a virtual local area network (VLAN) technology and protocols, central control element 24 may also communicate with access element 15 over network 50. Suitable VLAN protocols include the IEEE 802.1Q (VLAN tagging) protocol or any other protocol allowing for a logical or virtual link layer connection between the central control element and the access elements. Of course, access element 15 can also be configured to operate in connection with central control element 26. According to the deployment architecture illustrated in FIG. 5, wireless traffic associated with remote client elements 16, 18; 20, 22, according to one embodiment, can be tunneled between the central control element 24 and the access elements 12, 14. In another embodiment, access elements 12, 14 can operate to directly bridge network traffic between remote client elements 16, 18; 20, 22 and network 50, while tunneling network management messages, such as authentication and association requests from remote client elements to central control element 24 as discussed above. In addition, according to either embodiment, access elements 12, 14, central control element 24, or both access elements 12, 14 and central control element 24 can include layer 2 discovery mechanisms allowing for automatic discovery and configuration across network 50 of the components (central control elements and access elements) effecting the wireless network environment.

Figure 2:
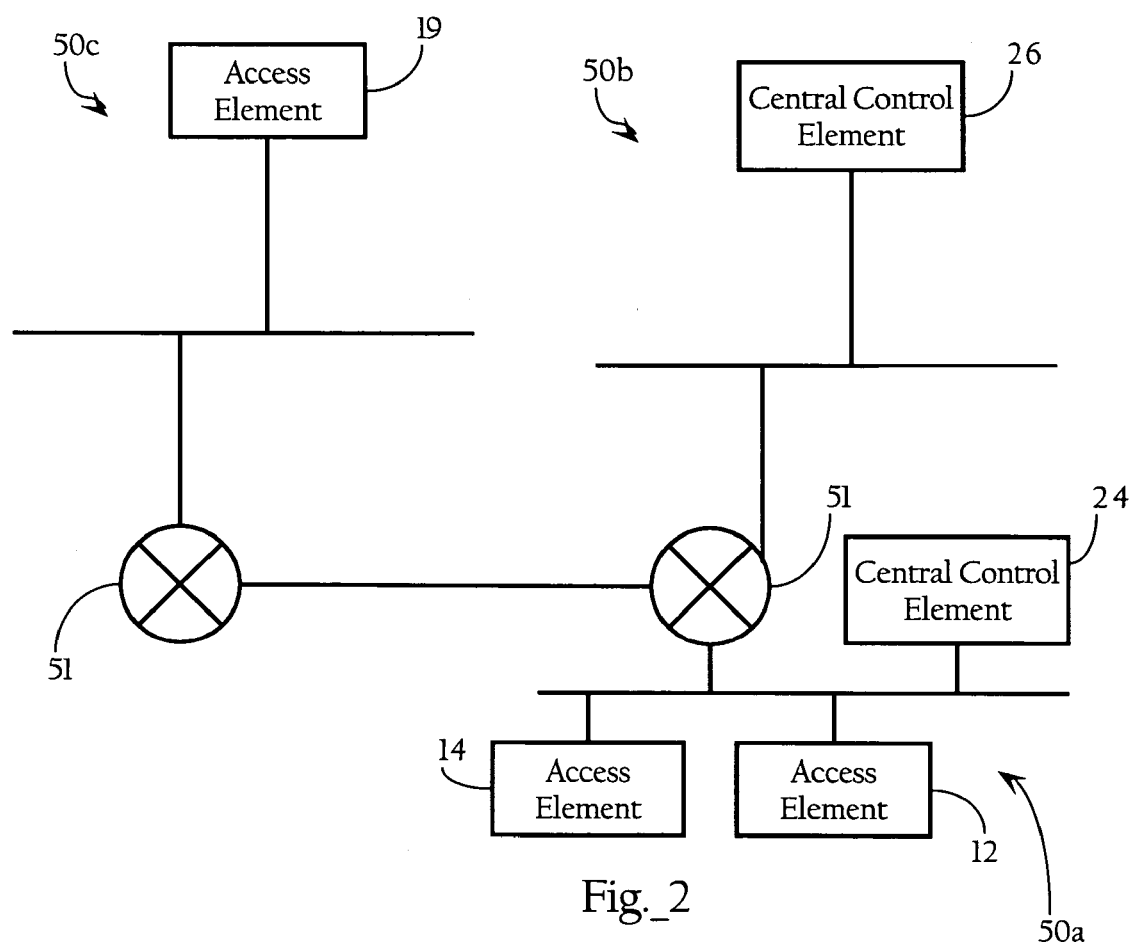
FIG. 2 is a functional block diagram illustrating a hierarchical wireless network system deployed across a network.

FIG. 2 illustrates a subset of the components of a hierarchical wireless network system deployed across a wired network environment. Specifically, routers 51 operably connect LAN segments 50a, 50b, and 50c. As FIG. 2 illustrates, central control element 24 and access elements 12, 14, are connected to LAN segment 50a. LAN segment 50b includes central control element 26, while LAN segment 50c includes access element 19. In one embodiment, central control elements 24, 26 are each configured with the IP or other network layer address of at least one other central control element. For example, central control element 24 may be configured with the IP address of central control element 26 and/or other central control elements. In one embodiment, each central control element 24, 26 maintains a mobility group data structure that stores the IP addresses of the central control elements and the mobility group identifiers corresponding to each central control element. In one implementation, a mobility group is an administratively (manually) or automatically defined grouping of central control elements some of whose access elements share radio connectivity to facilitate various wireless management tasks such as load sharing and hand-offs between access elements. Still further, each central control element, in one implementation, is configured with a mobility group identifier, which is advertised in various wireless management frames. In one implementation, wireless clients may use the mobility group identifier, during roaming, to preferentially select access elements that advertise the same mobility group identifier. With knowledge of the IP address of central control element 26, central control element 24 may more efficiently accomplish hand-offs of wireless clients from an access element controlled by it to an access element controlled by central control element 26. In one embodiment, once the mobility group is defined, the central control elements are operative to monitor the status (e.g., up or down) of the other central control elements in that mobility group. In one embodiment, this is accomplished by periodically transmitting "keep-alive" packets or other messages to the other central control elements in the mobility groups. If a central control element does not respond to the "keep-alive" packet after a threshold period of time, the transmitting central control element assumes that it is down. To add a central control element to a given mobility group, a network administrator accesses a configuration interface for a central control element within that group and specifies the mobility group identifier and the IP address of the central control element. In one implementation, a user may also configure the central control element with the IP addresses of other central control elements in that mobility group. In other implementations, a new central control element may be automatically configured as a member of a mobility group using multicast announcements or other protocols, such as the Service Location Protocol (RFC 2608). The updated mobility group data is then shared across the other central control elements in that group. In other implementations, the central control element can automatically discover the mobility group information, as well as the IP/network address of the central control elements in that mobility group, using layer 2 and/or layer 3 discovery methods. Still further, the IP or network addresses of the central control elements can be static or dynamic. For example, the central control elements may lease network addresses from a DHCP server operably connected to network 50.

B. Operation of Inter-Switch Roaming Functionality

In one implementation, the present invention includes extensions to the IEEE 802.11 WLAN protocols implemented on wireless clients and the wireless network infrastructure. The present invention, however, can be implemented in any suitable wireless network implementing other WLAN protocols. In one implementation, the central control elements (e.g., 24) advertise their corresponding mobility group identifier and IP address in various wireless management frames. In 802.11 network deployments, the central control elements include the mobility group identifier and the IP address in an information element added to beacon frames, probe response frames, association response frames, re-association response frames and disassociation frames, as discussed in more detail below (see AP_DETAILS information element). Wireless clients, in one implementation, cache the IP address and mobility group identifier of the central control element with which it associates (via an access point) and provides this information during re-associations with other central control elements.

Figure 3:
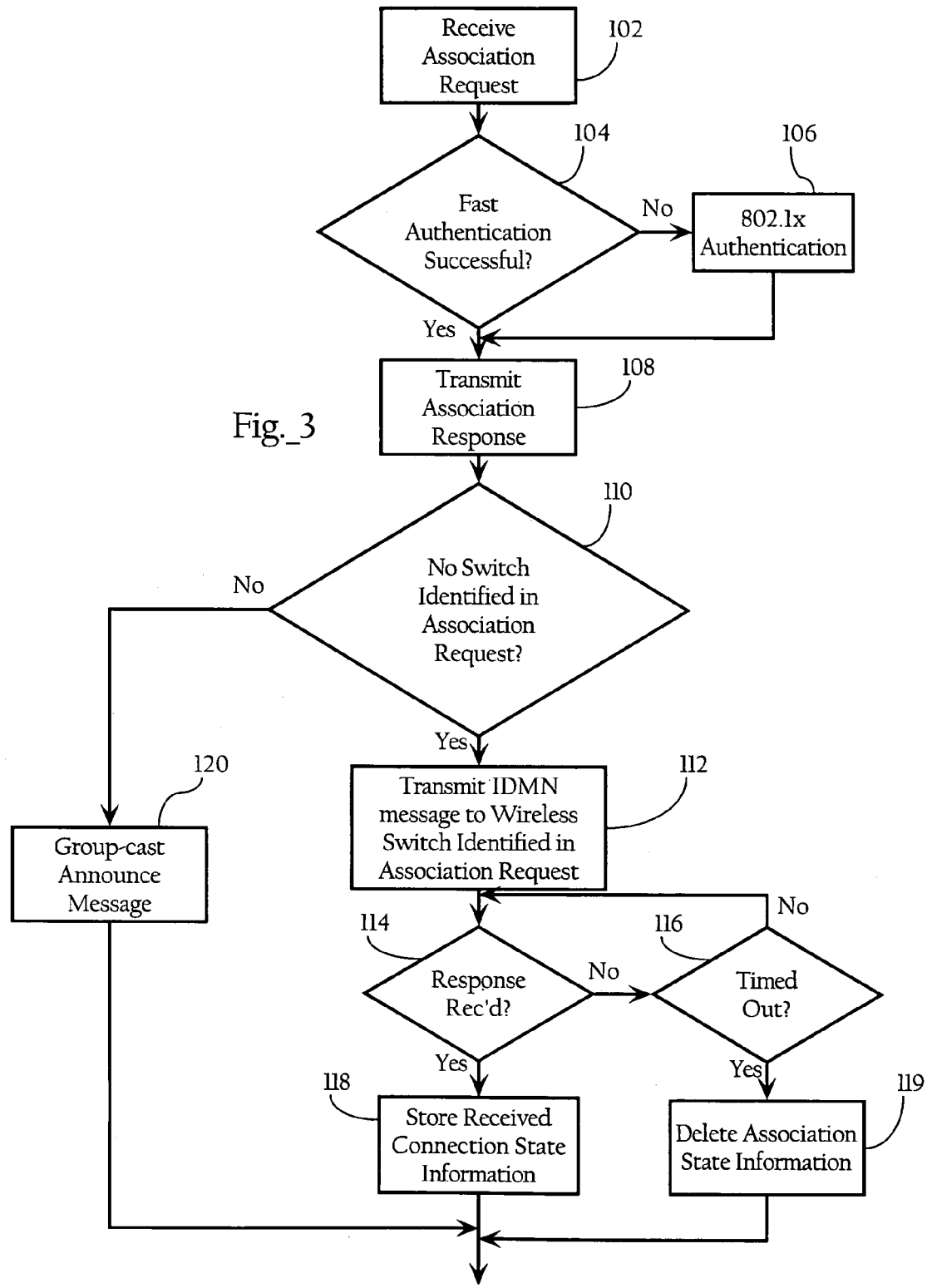
FIG. 3 is a flow chart diagram illustrating the process flow, according to one implementation of the present invention, directed to processing association requests transmitted by wireless clients.

FIG. 3 illustrates a process flow, according to one embodiment of the invention, implemented by a central control element in response to an association or re-association request transmitted from a wireless client. When a central control element receives an association request (102), it determines whether any authentication credentials can be re-used in a fast authentication process (104). If so, the central control element transmits an association response to the client (108). Otherwise, an authentication process, such as an 802.1x authentication, is performed (106). If the association request transmitted by the wireless client identifies a central control element (switch) (110), the central control element transmits an inter-domain mobility notification (IDMN) message to the identified central control element (112), as discussed in more detail below.

As discussed above, when a wireless client roams from one access point and associates with a new access point, it includes the IP address of the central control element with which it was previously associated through a given access point. In one implementation, the wireless client obtains the IP address of a central control element in the association response (included, in one implementation, in an AP_DETAILS information element) transmitted during the association phase. During a handoff event, a wireless client sends the stored IP address (and, in one implementation, the mobility group identifier) of the previous central control element in an association or re-association request frame (in one implementation, in a STATION_DETAILS information element).

If the association request transmitted by the wireless client does not identify a central control element, the new central control element group-casts to the other central control elements (or broadcasts/multicasts) a message announcing the client's association to identify the central control element, if any, with which the client was previously associated (120). That is, central control elements, in one implementation, are configured to check their association tables in response to announce messages and respond to the transmitting central control element if the client's MAC address (included in the announce message) is contained in its association tables. In one implementation, the response includes any state information corresponding to the client identified in the announce message. This also allows other central control elements to clean up their connection state data structures in response to the announce message.

However, if the association request identifies another central control element, after responding to the wireless client by transmitting an association response, the new central control element, in one implementation, sends an inter-domain mobility notification (IDMN) message to the old central control element specified in the STATION_DETAILS Information Element (112). Of course, if the client roams to a new access point controlled by the same central control element, no IDMN messages are required. In one implementation, IDMN messages are encrypted using an 'inter-mobility domain secret'. Furthermore, the unicast IDMN message, in one implementation, obviates the need to broadcast a message that announces the association to other central control elements.

In some situations (especially in picocell environments where access points and central elements are deployed in relatively large density), a potential exists for a race condition, if a wireless client device were to attempt re-associations with a number of central control elements in succession, such as attempting to association with two central control elements in alternating succession, or attempting a re-association with a second central control element before completing a re-association with a first central control element. In order to reduce the unneeded exchanges of connection state information, the wireless client, in one implementation, uses a handoff count, which is included in the IDMN messages transmitted between central control elements. In such an implementation, wireless clients maintain a handoff counter, which is monotonically incremented every time a wireless client issues an Association Request or Re-Association Request to a new access point (meaning the message is sent to an AP other than the one the station is currently association with). The current value of the handoff counter is included by the wireless client in the STATION_DETAILS IE attached to the association request. Central control elements can make use of the STATION_DETAILS information element to detect these "ping-pong" events, by evaluating whether the handoff counter corresponding to a wireless client in its association table is greater than the value found in the IDMN message. For instance, if the locally cached handoff counter value is higher than the IDMN message, the new central control element does not transmit connection state information to the central control element that transmitted the IDMN message, as the wireless client has already come back to and associated with the new central control element.

For example, assume that a wireless client associates with a first access point (managed by a first central control element), roams to and associates with a second access point (managed by a second central control element), and then roams to and associates with the first access point before the first and second central control elements have exchanged connection state information. By inspecting the handoff count in the association request transmitted by the wireless client, the first and second central control elements can prevent the unneeded transfer of connection state information. For example, assume that during the first association, the wireless client transmits an association request including a handoff counter value of 10. When it roams to the second access point, the wireless client increases the handoff counter value to 11, and includes the new handoff counter value in the association request transmitted to the second access point. The second central control element, in one implementation, accepts the association and transmits an association response to the wireless client. According to the example set forth above, when the wireless client roams back to the first access point, it again increments the handoff counter to 12, which value is included in the association response transmitted to the first access point. In the example, the second central control element transmits an IDMN message to the first central control element including an identification of the wireless client and the handoff counter value it received (here, 11). The first central control element receives the IDMN message and compares the handoff counter it has cached in association with the wireless client to the handoff counter value in the received IDMN message. Since the locally cached handoff counter value is greater, the first central control element, in one implementation, ignores the IDMN message transmitted by the second access point. If the handoff counter value in the IDMN message is greater than the locally cached handoff counter value, the first central control element responds to the IDMN message with connection state information corresponding to the wireless client.

Accordingly, as FIG. 3 illustrates, the second central control element monitors for a response to the IDMN message (114, 116). If the response times out (116), the second central control element eventually deletes the association state information from its association tables (119) in a background process. However, if the second central control element receives a response to the IDMN message, it stores the connection state information it receives from the first central control element (118). Of course, other implementations are possible. As discussed below, central control elements can be configured to transmit explicit responses to IDMN messages, as opposed to simply discarding or ignoring them.

In addition, after a successful association, the central control element allows the DHCP (or other dynamic network address assignment) mechanisms to complete. However, until the association and network address assignments are successful, the central control element does not respond to Address Resolution Protocol messages identifying the client, or allow data packets corresponding to the client to pass. In one implementation, the new central control element does not respond to, or otherwise transmit Address Resolution Protocol (ARP) messages until it has received a response from the previous central control element. In addition, upon receipt of the IDMN message, the previous central control element removes any processing rules corresponding to the client from its network processing unit (NPU) and deletes its ARP entry for the client.

As to the fast authentication process, in implementations using 802.1x or other authentication mechanisms, the new central control element also determines whether credentials are already present, or whether a full 802.1x authentication exchange will be required. Still further, the mobility group identifiers can be used to group central control elements, and control the manner in which authentication credentials and encryption keys are cached and shared. In one implementation, encryption keys established during an 802.1X authentication can be re-used across all central control elements and access elements within a single mobility group. Within a given mobility group, all central control elements have access to the Pairwise Master Key (PMK) information of every associated and authenticated client. To accomplish this, a central control element pushes the PMK information to all peer central control elements in the mobility group, upon completion of each 802.1X/EAP authentication. In one implementation, wireless clients are configured to use the mobility group identifier to determine whether a previously created PMK (and potentially the associated Pairwise Transient Key (PTK)) may be re-used after a handoff to a new access element. When a wireless client encounters an access element that is advertising a new mobility group identifier, it recognizes that an 802.1X authentication will be required (or it must have a cached PMK/PTK that was previously created via a successful authentication). In order to be capable of caching PMK/PTKs for various mobility domains, the client includes the mobility group identifier in its key cache entry.

Still further, FIGS. 4A and 4B illustrate the integration of a key distribution and caching mechanism according to one implementation of the present invention. In one implementation, the present invention includes extensions to the IEEE 802.11 WLAN protocols implemented on wireless clients and the wireless network infrastructure. The present invention, however, can be implemented in any suitable wireless network implementing other WLAN protocols. In one implementation, the central control elements (e.g., 24) advertise their corresponding mobility group identifier and IP address in various wireless management frames. In 802.11 network deployments, the central control elements include the mobility group identifier and the IP address in an information element added to beacon frames, probe response frames, association response frames, re-association response frames and disassociation frames, as discussed in more detail below (see AP_DETAILS information element). Wireless clients, in one implementation, cache the IP address and mobility group identifier of the central control element with which it associates (via an access point) and provides this information during re-associations with other central control elements.

FIGS. 4A and 4B illustrate a process flow implemented by a central control element in response to an association or re-association request frame transmitted from a client. In one implementation, and as discussed more fully below, central control element stores PMKs generated during an 802.1x authentication between clients and an authentication server (e.g., RADIUS, etc.) in a cache. In one implementation, PMKs are stored in association with a client MAC address and, optionally, a time-to-live value indicating the expiration time of the PMK. Likewise, wireless clients are also configured to cache PMKs. In one implementation, the wireless client and control element first complete a null authentication phase (not illustrated).

When a central control element receives an association request (202), it transmits an association response (204), and determines, using the MAC address of the client, whether it has a valid, unexpired Pair-wise Master Key (PMK) corresponding to the client stored in a cache (206). If so, the central control element and the client engage in a handshake process to generate Pair-wise Transient Keys (PTKs) using the stored PMK (208). PTKs are used for encryption and authentication of wireless frames transmitted between the central control element (via an access element) and the client. If the fast authentication method was not successful (e.g., the client did not have a matching PMK, etc.) (210), the central control element initiates and proxies a full 802.1x authentication between the wireless client and an authentication server (212). In one implementation, the central control element is configured to include an authenticator, while the wireless client includes a supplicant. The authenticator essentially proxies the exchange between the authentication server and the supplicant/client. When the authentication server generates the PMK after a successful authentication, it distributes the PMK to both the authenticator and the supplicant. As FIG. 3A illustrates, after the central control element receives the PMK it pushes the PMK to all other central control elements within its mobility group (214). The message including the PMK also identifies the client (by MAC address) and includes an expiration time.

As FIG. 4B illustrates, the central control element may also perform other operations, such as interacting with the old central control element with which the client was previously associated to exchange connection state information. For example, if the association request transmitted by the client identifies a central control element (switch) (218), the central control element transmits an inter-domain mobility notification (IDMN) message to the identified switch (220). In one implementation, the central control elements can be configured, as discussed above, to conditionally respond to IDMN messages based on a comparison of handoff counter values. However, in another implementation, the central control elements can be configured to transmit a response to IDMN messages, where the response indicates whether the receiving central control element should delete the wireless client from its association tables, or should add connection state information in the response to its association tables or other data structures, as discussed in more detail below. More specifically, after a first central control element transmits an IDMN message identifying a wireless client and a handoff counter value, a second central control element compares the handoff counter value in the message to a locally cached handoff counter value, if any, for the identified wireless client. If the handoff counter value in the local cache is greater than the corresponding value in the IDMN message, the second central control element transmits a response to the IDMN message indicating that the first central control element should delete the wireless client from its association tables. On the other hand, if the handoff counter value in the local cache is less than the corresponding value in the IDMN message, the second central control element transmits a response with the connection state information corresponding to the wireless client identified in the IDMN message.

Accordingly, as FIG. 4B illustrates, after transmitting an IDMN message, the central control element monitors for a response (222, 224). If the response times out, the group-casts to the other central control elements (or broadcasts/multicasts) a message announcing the client's association to identify the central control element, if any, with which the client was previously associated (228). If the central control element receives a response, however, it either deletes the wireless client from its association tables (232), or stores connection state information received in the response (230), depending on the content of the response (226).

C. Wireless Frame Formats

To implement the functions described above in an 802.11 WLAN environment, extensions to some 802.11 MAC Management frames may be required. This section describes the frame formats and information elements, according to one implementation of the invention, used to implement many of the functions that support the handoff functionality described above. In one implementation, the Beacon, Probe Response, Association Request, Reassociation Request, Association Response, Reassociation Response, and Disassociation frames carry an information element, and in one implementation a Vendor-specific information element. Each of these frames will be described. In addition, the format and content of the Vendor-specific information element are described.

C.1. Beacon and Probe Response Frames

The Beacon and Probe Response frames both include the Vendor-specific information element following all information elements defined to be present in the frames by the IEEE 802.11 specification and its amendments. The Vendor-specific information element may appear more than once in a frame. The Beacon and Probe Response frames, in one implementation, may include the WLAN Capabilities and AP Details information elements, as set forth below.

C.2. Association and Reassociation Request Frames

The Association Request and Reassociation Request frames both include the Vendor-specific information element following all information elements defined to be present in the frames by the 802.11 standard and its amendments. The Vendor-specific information element may appear more than once in a frame. The client also includes the AP details information element, which includes the mobility domain and address information which the client received in the previous successful association.

C.3. Association and Reassociation Response Frames

The Association Response and Reassociation Response frames, in one implementation, both include the Vendor-specific information element following all information elements defined to be present in the frames by the 802.11 standard and its amendments. The Vendor-specific information element may appear more than once in a frame. The association and reassociation response frames may include the WLAN Capabilities information elements.

C.4. Disassociation Frames

The Disassociation frame, in one implementation, includes the Vendor-specific information element following the Reason Code defined to be present in the frames by the 802.11 standard and its amendments.

C.5. Vendor-Specific Information Element

The Vendor-specific information element is a standard information element defined in 802.11 where the Element ID value of 221 (0xdd) has been allocated by the 802.11 working group to designate an information element that may be used for carrying proprietary information. The 802.11 working group requires that the first three bytes following the Length be the OUI (IEEE-assigned Organizational Unique Identifier) of the vendor that has defined the particular information element being transmitted. The format of the Vendor-specific information element is shown in the following Table.

TABLE 1

Vendor-specific Information Element Format

| ELEMENT ID (221) | LENGTH | OUI | INFORMATION FIELD |
|---|---|---|---|
| 1 BYTE | 1 BYTE | 3 BYTES | N BYTES |

The Vendor-specific information elements described herein, the value of the OUI field, in one implementation, is 0x000b85. For all Vendor-specific information elements where the OUI is 0x000b85, the first byte of the Information Field is the Sub-element ID. The following table describes the allowable values for the sub-element ID according to one implementation of the present invention.

TABLE 2

Sub-element ID Values

| SUB-ELEMENT ID | DESCRIPTION |
|---|---|
| 0 | RESERVED |
| 1 | RESERVED |
| 2 | RESERVED |
| 3 | RESERVED |
| 4 | WLAN CAPABILITIES |
| 5 | AP DETAILS |
| 6-255 | RESERVED |

C.6 WLAN Capabilities

The WLAN Capabilities information element is used by the central control element (switch) and AP to indicate the features and functions present in the WLAN that a client device, such as a client, can make use of. The format of the information element is shown in Table 3

TABLE 3

WLAN Capabilities Format

| Length (bytes) | Description |
|---|---|
| 1 | Element ID (221 = Vendor-specific information element) |
| 1 | Length (number of bytes following this field = 5) |
| 3 | OUI (0x00, 0x0b, 0x85) |
| 1 | Sub-element ID (WLAN Capabilities = 4) |
| 1 | Capabilities (bit significant) |

There is a single field specific to this information element.

Capabilities: This field is a variable length bit field. The bit field is segmented at each byte boundary to prevent ambiguity in the transmission order as the bit field expands as new capabilities are included in the system. Each bit of this field has significance independent of any other bit in the field. The format of the field is shown in Table 4.

TABLE 4

Format of the Capabilities Field

| Byte | Bit | Description |
|---|---|---|
| 0 | 0 | Proxy ARP |
| 0 | 1 | Platinum Queue/Dynamic QoS |
| 0 | 2 | Cooperative Handoff |
| 0 | 3 | Single Authentication |
| 0 | 4 | Reserved |
| 0 | 5-7 | Reserved (transmit as 0, ignore on reception) |

The bits of the Capabilities field are defined below.

Proxy ARP: When the value of this bit is 1, the switch/AP provides proxy ARP service for associated client devices. When the value of this bit is 0, no proxy ARP service is provided;

Platinum Queue/Dynamic: When the value of this bit is 1, the switch/AP provides dynamic QoS using the Vendor-specific information element and reassociation of the client device. When the value of this bit is 0, no dynamic QoS service is provided.

Cooperative Handoff: When the value of this bit is 1, the switch/AP provides cooperative handoff services using the Vendor-specific information element. When the value of this bit is 0, no cooperative handoff service is provided. Single Authentication: When the value of this bit is 1, the switch/AP provides single authentication services for 802.1X as the client roams from one AP to another in the same mobility group. When the value of this bit is 0, no single authentication service is provided.

C. 7. AP Details

The AP Details information element is used to announce information about the access element and its associated central control element. The wireless client uses this information when roaming from one access element to another. The format of the information element is shown in Table 5.

TABLE 5

AP Details Format

| Length (bytes) | Description |
|---|---|
| 1 | Element ID (221 = Vendor-specific information element) |
| 1 | Length (number of bytes following this field = 13) |
| 3 | OUI (0x00, 0x0b, 0x85) |
| 1 | Sub-element ID (AP Details = 5) |
| 1 | Load Factor (%) |
| 8 | Mobility Group Identifier |
| 4 | Central Controller Address |

The fields of the AP Details information element are defined as follows.

Load factor: This is the value, in per cent, of the load carried by the AP described in the descriptor. This value is ignored when the IE is included in the client's Association Requests Mobility Group Identifier: This is a unique value that identifies all of the switches, and the APs that are connected to these switches, in a common mobility group.

Controller Address: This is the IP address of the AP (or controller in a hierarchical system)

C.8. Client Details Information Element

The Client Details information element is used to announce information about the wireless client, such as the handoff counter, and the access element/central control element with which it was previously associated. As discussed above, wireless clients and central control elements use this information during roaming. The format of the information element is shown in Table 6.

TABLE 6

Client Details Format

| Length (bytes) | Description |
|---|---|
| 1 | Element ID (221 = Vendor-specific information element) |
| 1 | Length (number of bytes following this field = 13) |
| 3 | OUI (0x00, 0x0b, 0x85) |
| 1 | Sub-element ID (Client Details = 6) |
| 4 | Hand-off Counter |
| 8 | Mobility Group Identifier |
| 4 | Controller Address |

The fields of the Client Details information element are defined as follows.

Hand-off Counter: This counter maintained by the client and is monotonically increased upon every association request.

Mobility Group Identifier: This value is sent to the client in the AP Details IE and is cached by the client when it successfully associates with an AP.

Controller Address: As discussed above, this value is sent to the client in the AP Details IE and is cached by the client when it successfully associates with an AP.

The invention has been explained with reference to specific embodiments. Other embodiments will be evident to those of ordinary skill in the art. In addition, the present invention can be applied to a wireless network system comprising a plurality of conventional, substantially autonomous access points. In addition, although embodiments of the present invention have been described as operating in 802.11 wireless networks, the present invention can be applied other wireless network environments implementing alternative networking protocols.

Furthermore, the present invention has application to other wireless network environments and implementations; for example, the division of functionality between the access elements and the central control elements can be shifted. For example, the access elements can bridge network traffic associated with the remote client elements directly, while transmitting management packets to the central control element. It is, therefore, intended that the claims set forth below not be limited to the embodiments described above.

What is claimed is:

1. A wireless network access device, comprising: a network interface; a processor; a memory; and a wireless network access application, stored in the memory, comprising instructions operable to cause the processor and the network interface to:

store an Internet Protocol (IP) address of the wireless network access device; receive an association request from a wireless client, wherein the association request comprises a second IP address of a second wireless network access device with which the wireless client has been associated and a handoff counter value; transmit an association response to the wireless client; provide the IP address of the wireless network access device to the wireless client; transmit a mobility notification message identifying the wireless client to the second wireless network access device, the mobility notification message comprises the second IP address and the handoff counter value identified in the association request; store the handoff counter value in association with an identifier for the wireless client; receive a second mobility notification message from a third wireless network access device, the second mobility notification message identifies a second wireless client and a second handoff counter value, and the second wireless client has been associated with the wireless network access device; and compare the handoff counter value corresponding to the wireless client with the second handoff counter value corresponding to the second wireless client.

2. The wireless network access device of claim 1, wherein the IP address of the wireless network access device is appended to the association response transmitted to the wireless client.

3. The wireless network access device of claim 1, wherein the IP address of the wireless network access device is appended to a wireless network management frame.

4. The wireless network access device of claim 1, wherein the wireless network access application further comprises instructions operable to cause the processor and the network interface to conditionally respond to the second mobility notification message based on the handoff counter value and the second handoff counter value.

5. The wireless network access device of claim 4, wherein the wireless network access application further comprises instructions operable to cause the processor and the network interface to transmit a response to the second mobility notification message, wherein the response comprises connection state information corresponding to the second wireless client, if the handoff counter value is less than the second handoff counter value.

6. The wireless network access device of claim 4, wherein the wireless network access application further comprises instructions operable to cause the processor and the network interface to transmit a response to the second mobility notification message, wherein the response comprises instructions to delete connection state information corresponding to the second wireless client, if the handoff counter value is greater than the second handoff counter value.

7. In a wireless network access device operably connected to a wireless network and having an Internet Protocol (IP) address, a method comprising: receiving an association request from a wireless client, wherein the association request comprises a second IP address of a second wireless network access device with which the wireless client has been associated and a handoff counter value; transmitting an association response to the wireless client; providing the IP address of the wireless network access device to the wireless client; transmitting a mobility notification message identifying the wireless client to the second wireless network access device, the mobility notification message comprises the second IP address and the handoff counter value identified in the association request; storing the handoff counter value in association with an identifier for the wireless client; receiving a second mobility notification message from a third wireless network access device, wherein the second mobility notification message identifies a second wireless client and a second handoff counter value, and the second wireless client has been associated with the wireless network access device; and comparing the handoff counter value corresponding to the wireless client with the second handoff counter value corresponding to the second wireless client.

8. The method of claim 7, wherein the providing step comprises appending the IP address of the wireless network access device to the association response transmitted to the wireless client.

9. The method of claim 7, wherein the providing step comprises appending the IP address of the wireless network access device to a wireless network management frame.

10. The method of claim 7, further comprising conditionally responding to the second mobility notification message based on the handoff counter value and the second handoff counter value.

11. The method of claim 10, further comprising transmitting a response to the second mobility notification message, wherein the response comprises connection state information corresponding to the second wireless client, if the handoff counter value is less than the second handoff counter value.

12. The method of claim 10, further comprising transmitting a response to the second mobility notification message, wherein the response comprises instructions to delete connection state information corresponding to the second wireless client, if the handoff counter value is greater than the second handoff counter value.

13. A wireless network access device, comprising: means for storing an Internet Protocol (IP) address of the wireless network access device; means for receiving an association request from a wireless client, wherein the association request comprises a second IP address of a second wireless network access device with which the wireless client has been associated and a handoff counter value; means for transmitting an association response to the wireless client; means for providing the IP address of the wireless network access device to the wireless client; means for transmitting a mobility notification message identifying the wireless client to the second wireless network access device, the mobility notification message comprises the second IP address and the handoff counter value identified in the association request; means for storing the handoff counter value in association with an identifier for the wireless client; means for receiving a second mobility notification message from a third wireless network access device, the second mobility notification message identifies a second wireless client and a second handoff counter value, and the second wireless client has been associated with the wireless network access device; and means for comparing the handoff counter value corresponding to the wireless client with the second handoff counter value corresponding to the second wireless client.

14. A wireless network system, comprising: a plurality of access elements, wherein each access element is capable of: communication with one of at least one central control element; and wireless communication with at least one wireless client in connection with the central control element; and the at least one central control element, wherein each central control element is capable of supervising at least one of the plurality of access elements and is operative to:
Manage wireless connections between the access elements supervised by the central control element and their corresponding wireless clients; store an Internet Protocol (IP) address of the central control element; receive, through a first access element, an association request from a wireless client, wherein the association request comprises a second IP address of a second central control element that supervises a second access element with which the wireless client has been associated and a handoff counter value maintained by the wireless client; transmit, through the first access element, an association response to the wireless client; provide the IP address of the central control element to the wireless client; transmit a mobility notification message identifying the wireless client to the second central control element, wherein the mobility notification message comprises the second IP address and the handoff counter value identified in the association request; store the handoff counter value in association with an identifier for the wireless client; receive a second mobility notification message from the second central control element or a third central control element, wherein the second mobility notification message identifies a second wireless client and a second handoff counter value; compare the wireless client with the second wireless client and the handoff counter value corresponding to the wireless client with the second handoff counter value corresponding to the second wireless client; when the wireless client is the same as the second wireless client and the handoff counter value is greater than the second handoff counter value, then ignore the second mobility notification message; and when the wireless client is the same as the second wireless client and the handoff counter value is less than the second handoff counter value, then respond to the second mobility notification message by transmitting connection state information corresponding to the wireless client to the second or the third central control element.

* * * * *

UNITED STATES PATENT AND TRADEMARK OFFICE
CERTIFICATE OF CORRECTION

PATENT NO. : 7,596,376 B2  Page 1 of 1
APPLICATION NO. : 11/182239
DATED : September 29, 2009
INVENTOR(S) : Calhoun et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 363 days.

Signed and Sealed this

Twenty-eighth Day of September, 2010

David J. Kappos
*Director of the United States Patent and Trademark Office*